United States Patent
Mitchell

(10) Patent No.: US 8,721,341 B2
(45) Date of Patent: May 13, 2014

(54) SIMULATED TRAINING ENVIRONMENTS BASED UPON FOVEATED OBJECT EVENTS

(75) Inventor: Brian T. Mitchell, Swartz Creek, MI (US)

(73) Assignee: Optimetrics, Inc., Ann Arbor, MI (US)

( * ) Notice: Subject to any disclaimer, the term of this patent is extended or adjusted under 35 U.S.C. 154(b) by 2826 days.

(21) Appl. No.: 11/070,038

(22) Filed: Mar. 2, 2005

(65) Prior Publication Data

US 2005/0195165 A1 Sep. 8, 2005

Related U.S. Application Data

(60) Provisional application No. 60/549,489, filed on Mar. 2, 2004.

(51) Int. Cl.
*G09B 1/00* (2006.01)

(52) U.S. Cl.
USPC ........... 434/247; 434/118; 434/322; 434/323; 434/350; 434/353; 434/362; 434/367; 345/156; 345/158

(58) Field of Classification Search
CPC ................................. G09B 1/00; G06F 3/013
USPC ................. 434/118, 247, 322, 323, 350, 367; 345/156, 158
See application file for complete search history.

(56) References Cited

U.S. PATENT DOCUMENTS

| | | | |
|---|---|---|---|
| 4,789,235 A | 12/1988 | Borah et al. .................. 351/246 |
| 5,898,423 A | 4/1999 | Tognazzini et al. ........... 345/158 |
| 6,091,378 A * | 7/2000 | Richardson et al. .............. 345/7 |
| 6,097,927 A * | 8/2000 | LaDue ........................... 434/308 |
| 6,106,119 A * | 8/2000 | Edwards ....................... 351/209 |
| 6,152,563 A * | 11/2000 | Hutchinson et al. .......... 351/209 |
| 6,243,076 B1 * | 6/2001 | Hatfield ........................ 345/156 |
| 6,323,884 B1 * | 11/2001 | Bird et al. ..................... 715/810 |
| 6,381,339 B1 * | 4/2002 | Brown et al. .................. 382/100 |
| 6,433,759 B1 * | 8/2002 | Richardson et al. .............. 345/7 |
| 6,526,159 B1 * | 2/2003 | Nickerson ..................... 382/117 |
| 6,553,281 B1 * | 4/2003 | Liu ................................. 700/302 |
| 6,577,329 B1 * | 6/2003 | Flickner et al. ............... 715/774 |
| 6,601,021 B2 | 7/2003 | Card et al. ..................... 702/187 |
| 6,803,887 B1 | 10/2004 | Lauper et al. ..................... 345/9 |
| 2002/0103625 A1 * | 8/2002 | Card et al. ..................... 702/187 |
| 2002/0126090 A1 * | 9/2002 | Kirkpatrick et al. .......... 345/158 |
| 2003/0146901 A1 * | 8/2003 | Ryan ............................. 345/158 |
| 2003/0211449 A1 * | 11/2003 | Seiller et al. .................. 434/258 |
| 2003/0232319 A1 * | 12/2003 | Grisham et al. ............. 434/362 |
| 2004/0075645 A1 * | 4/2004 | Taylor et al. .................. 345/157 |

* cited by examiner

*Primary Examiner* — Xuan Thai
*Assistant Examiner* — Alvin Carlos
(74) *Attorney, Agent, or Firm* — Gifford, Krass, Sprinkle, Anderson & Citkowski, P.C.

(57) ABSTRACT

Objects associated with eye fixations are used to support training tasks that are characterized by operation within a dynamic 3D environment, problem-solving that involves user multitasking, short decision time periods, heavy workloads, potential for unexpected events, and the need for high-performance skills. The invention is ideally suited to measure the nuances associated with maintaining situation awareness in such problems where dynamic 3D environments that support problem solving with high cognitive fidelity have already been developed. Potential training application areas include urban warfighting, night vision goggle use, aircraft piloting, helicopter operation, remote control of vehicles and robots, night driving, and air traffic control.

31 Claims, 9 Drawing Sheets

SIMULATED TRAINING ENVIRONMENTS BASED UPON FOVEATED OBJECT EVENTS

REFERENCE TO RELATED APPLICATION

This application claims priority from U.S. Provisional Patent Application Ser. No. 60/549,489, Mar. 2, 2004, the entire content of which is incorporated herein by reference.

FIELD OF THE INVENTION

This invention relates to a system and method for calculating foveated-object events (or eye events) that correspond to visual fixations on objects within a dynamic field of view, and more particularly, to such a system in which fixation points are registered to an internal computer model that represents the field of view to determine the fixated object within the model, an eye event that corresponds to that object is constructed and placed in the computer environment, and the resulting eye events are subsequently used by computer applications as input user interaction information.

BACKGROUND OF THE INVENTION

Over the last decade eye-tracking systems have become increasingly sophisticated. Several eye-tracking systems are currently available as commercial products. These systems are typically based on three methods: video oculography (VOG), infrared oculography (IROG), and electro-oculography (EOG). The VOG method calculates eye position based on the relative position of the cornea and reflected pupil glint. This method uses a video camera to capture images of the eye, an infrared emitter to produce a point reflection on the eye images, and image processing methods to extract geometrical information from the images. The IROG method calculates eye position based on the amount of reflected light. This method uses mounted infrared emitters to produce reflections off of the eye, detectors that measure reflected light, and algorithms that determine eye position from the distribution of light across the geometrically located detectors. The EOG method calculates eye position based on electrical signals that are generated from electrodes placed around the eye. This method uses the signals from the geometrically positioned electrodes and algorithms that determine eye position from the distribution of signals across the electrodes. Each of these three methods typically locates eye position as an (x,y) point on a viewing plane or as a point (x, y, z) in 3-space at the rate of 1/30 second or faster.

Despite significant progress, widespread application of the technology has failed to become a reality. In part, this is due to the remaining high cost of eye-tracker devices. An additional barrier, however, is the difficulty in mapping the sequence of fixation points produced by an eye-tracker to objects that are present in the individual's field of view. Because of the point-to-object problem, successful use of eye-tracker technology often requires manual frame-by-frame identification of fixated objects Jacob & Karn, 2003. Although this is adequate for some research applications, it is simply too costly and too cumbersome for widespread use.

Attempts at automating the mapping of points to objects have proven difficult. Generally, these attempts have fallen into two classes. One class involves using image-processing techniques to segment objects from a captured video sequence that corresponds to the field of view. Another class involves using features of the application to make the identification of objects easier. Although successes have been developed using approaches from both of these classes, a general solution to the point-to-object problem still remains.

The development of algorithms that automatically segment objects from a captured rasterized image stream has received much attention in the research literature. Despite extensive work, general-purpose, high-performance segmentation algorithms have proven elusive. Current segmentation algorithms often require custom development and remain error prone. Many of the current methods and techniques for automatic segmentation are described in Fu & Mui, 1981, Haralick & Shapiro, 1985, and Pal & Pal, 1993. An example of the segmentation approach is found in U.S. Pat. No. 6,803,887 that discloses a method for supplying a mobile user with service information relating to real world objects. This method relies on and assumes segmentation of real-world objects captured in raster format. It does not consider objects that are rendered on a computer display.

Several methods for solving the point-to-object problem using problem features have been disclosed in the U.S. patent literature. U.S. Pat. No. 4,789,235 discloses a method and system for monitoring people watching television commercials. The disclosed method relies on the use of visual areas of interest with fixed locations on different television scenes. U.S. Pat. No. 5,898,423 discloses a method that detects an intersection of the gaze position with the image displayed on the display device. The disclosed method relies on the fact that at any point in time an image location is fixed and known as found in the display of text images. U.S. Pat. No. 6,601,021 discloses a method for mapping fixation points to objects (elements-of-regard) in a display of dynamic hypermedia pages through a browser that is connected to the world-wide-web. The invention discloses a mapping tool that maps fixations onto restored web pages to identify fixated objects that are contained within the web pages. The mapping tool identifies elements of restored web pages by accessing the object model interface of the browser that provides the content information for each of the rendered objects (elements). The objects are generally HTML elements that the browser renders and include text, images, hyperlinks, buttons, input boxes, etc. This method relies on the fact that objects in restored web pages have known locations.

Many application areas that require an understanding of when objects are fixated to explore and exploit the subtle differences found in the problem-solving methods of individuals could greatly benefit from a robust and real-time solution to the point-to-object problem in dynamic graphical environments that simulate the real world. Such a solution would enable the construction of eye events that capture a user's visual interaction with a display screen in computer applications that use a graphical user interface to simulate the real world and to communicate with the user. In advanced training systems, eye events would enable the measurement of how an individual maintains situation awareness in complex problem-solving tasks. In the area of cognitive science, eye events would enable the exploration of how an individual allocates critical cognitive resources while operating in a multi-tasking problem solving environment. In vehicle systems, eye events would enable recording of operator visual interactions with the environment for later analysis directed at understanding the operator's cognitive activity during a critical operational time period. In interface evaluation, eye events would allow more detailed understanding of how computer users interact with a computer application under study in time critical or production settings. In computer games, eye events would allow the development of games with behaviors of the objects within the game that are derived from the movement of the game player's eyes. In cooperative interfaces, eye events would enable the development of interfaces that assist the human operator in solving complex problems by observing the operator's behavior and redirecting the operator to time critical needs and/or invoking intelligent agents (or processes) that would synergistically solve other parts of the problem.

SUMMARY OF THE INVENTION

The present invention resides in a novel approach to calculating the objects associated with eye fixations. The benefits of this approach are significant. The invention is well-suited to support training tasks that are characterized by operation within a dynamic 3D environment, problem-solving that involves user multitasking, short decision time periods, heavy workloads, potential for unexpected events, and the need for high-performance skills. It is ideally suited to measure the nuances associated with maintaining situation awareness in such problems where dynamic 3D environments that support problem solving with high cognitive fidelity have already been developed. Potential training application areas include urban warfighting, night vision goggle use, aircraft piloting, helicopter operation, remote control of vehicles and robots, night driving, and air traffic control.

While the preferred embodiment of the present invention uses eye events to train individuals, other embodiments use eye events to conduct research in cognitive problem solving, to record meaningful data from vehicle operation, to perform in-depth interface evaluation on computer applications, and to develop advanced computer games, and use eye events as a building block for cooperative computer user interfaces.

The system of the present invention involves a calculation of the graphical object associated with a display fixation point. Three embodiments are described. The first tests for changes in the display after each object is drawn to determine the fixated object. The second writes a unique bit pattern into the non-display portion of each pixel as the objects are drawn so that every pixel knows its corresponding object. The third orders the graphics objects that intersect a ray emitting from the eyepoint and passing through the fixation point on the display screen.

Once this fixation object is determined, it is used to create eye events. An eye event is a computer event that tracks human eye movements on a computer screen similar to the way in which mouse events track mouse movements on a computer screen. When the eye fixates on a location on the computer screen, an event is generated and made available for use by the application. The event identifies the time the event occurred, the display location where the event occurred, and the graphics object displayed on the computer screen that corresponds to the visual fixation of the operator. The resulting event is then available to computer programs written using a conventional event-loop programming style. With eye events computer programs can then be written using graphics objects that "know" when they are viewed.

DETAILED DESCRIPTION OF THE INVENTION

Figure 1:
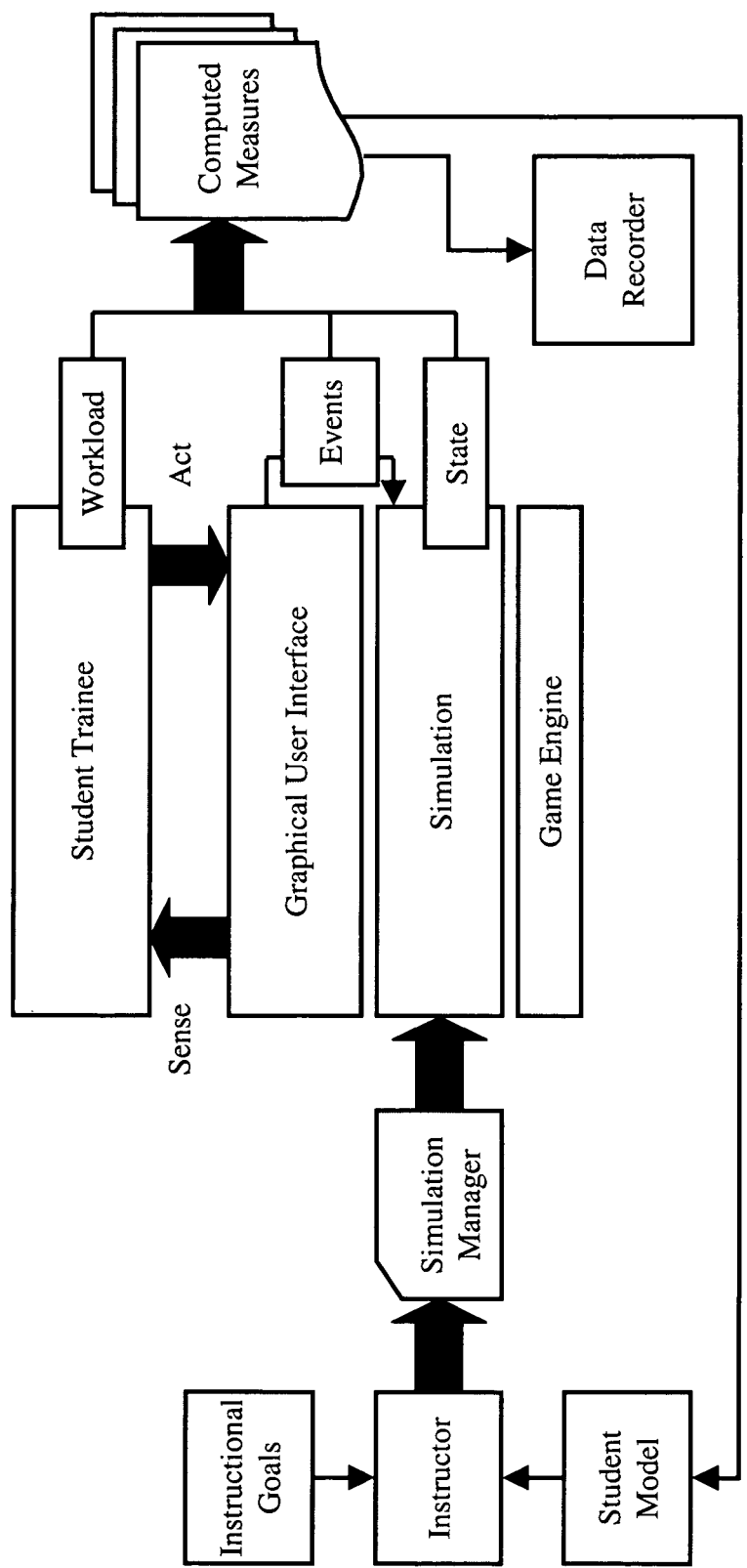
FIG. 1 is a block diagram of an eye-event-based training system according to the invention.

FIG. 1 is a block diagram of an eye-event-based student training system according to the invention. The trainee interacts through a graphical user interface with a computer simulation that may be built using a game engine. As with all of the embodiments described herein, the operator workload is optional and the degree of complexity associated with system state is variable.

A simulation manager responds to feedback that results from student trainee interaction with the interface by dynamically directing the activities and presentation of the simulation. As the simulation is running, workload, events, and simulation state data are collected and combined to form computed measures that may be recorded using a data recorder for later analysis and/or playback. The computed measures are feedback into a student model that represents current student understanding. An instructor dynamically synthesizes the current student understanding in the student model with the overall instructional goals and provides instructional direction to the simulation manager.

The system trains the student trainee in a high-performance skill. The computed measures capture subtle training aspects. In turn, an understanding of these aspects can be used to focus training. The eye events enable the development of this system as they capture the manner in which the trainee utilizes critical cognitive resources. This enables the development of computed measures that couple trainee workload and simulation state to cognitive activities.

The graphical user interface (GUI) is a well-known component of modern computer applications. It typically includes windows, menus, cursors, dialogs, and graphical scenes. The simulation module implements the training interactions that develop trainee skills. A simulation can be developed using a game engine to layer the code development as depicted in the figure. It can also be developed from scratch.

The game engine consists of content development, character modeling and animation, and world building tools; scripting, game control mechanisms, artificial intelligence (AI) and character control, and physics code modules; rendering, lighting, and sound system libraries; and networking capabilities. A description of game engine construction can be found in Zerbst & Duvel, 2004, Eberly, 2004a, and Eberly, 2004b.

The trainee workload can be measured using a variety of methods that are well known to the field of biomedical engineering. Typical methods described in the literature include cardiac measurement methods such as heart rate and HRV; ocular measurement methods such as blink rate and blink duration; respiratory measurement methods such as respiration rate and depth; brain activity measurement methods such as EEG, ERP, ERN, PET, fMRI, NIR, and FNIR. An overview of such methods can be found in The BioMedical Engineering Handbook edited by J. D. Bronzino, and published in 1995 by CRC Press, Inc.

The events consist of well-known events found in event-loop programming languages and eye-events, including menu events, mouse movement events, mouse click events, and keyboard events. The eye-events are produced when the user visually fixates a graphics object present in the user interface. Thus, the eye events let simulation objects that are displayed on the user interface know when they are fixated.

The state represents the current condition of the dynamic nature of the simulation. The state can be represented by a variety of standard computer representations such as a vector, array, structure, object, or finite state machine. It may include a history of conditions that allowed the simulation to reach the current state. It may also include a set of attributes that further describe each of the elements of the current state.

The computed measures are calculated using trainee workload values, events from the augmented event loop, and the state of the training simulation. These measures quantify such concepts as use of slack time, workload balance, switching overhead, efficiency of uncertainty resolution, use of strategic automaticity, use of daring scheduling, risk management, efficiency of awareness, parallelism of problem solving, optimum use of decision timelines, and maintenance of safe performance envelopes. These measures may also include pass-through values associated with workload, events, and state values.

The data recorder records the trainee workload, events from the augmented event loop, simulation state, and the computed measures for later review and analysis. The student model maintains an understanding of the current state trainee learning. It receives feedback from the computed measures and uses this feedback to update the model.

The instructional goals describe the overall goals associated with developing trainee skills. These goals are normally developed offline by instructional experts. The instructor is a computer module that decides how best to develop trainee skills. The module reviews student progress towards the instructional goals by inspecting the student model and recommends the instructional course of action to the simulation manager. The simulation manager directs the simulation to exhibit behaviors that enable further student training and learning of the instructional goals.

Figure 2:
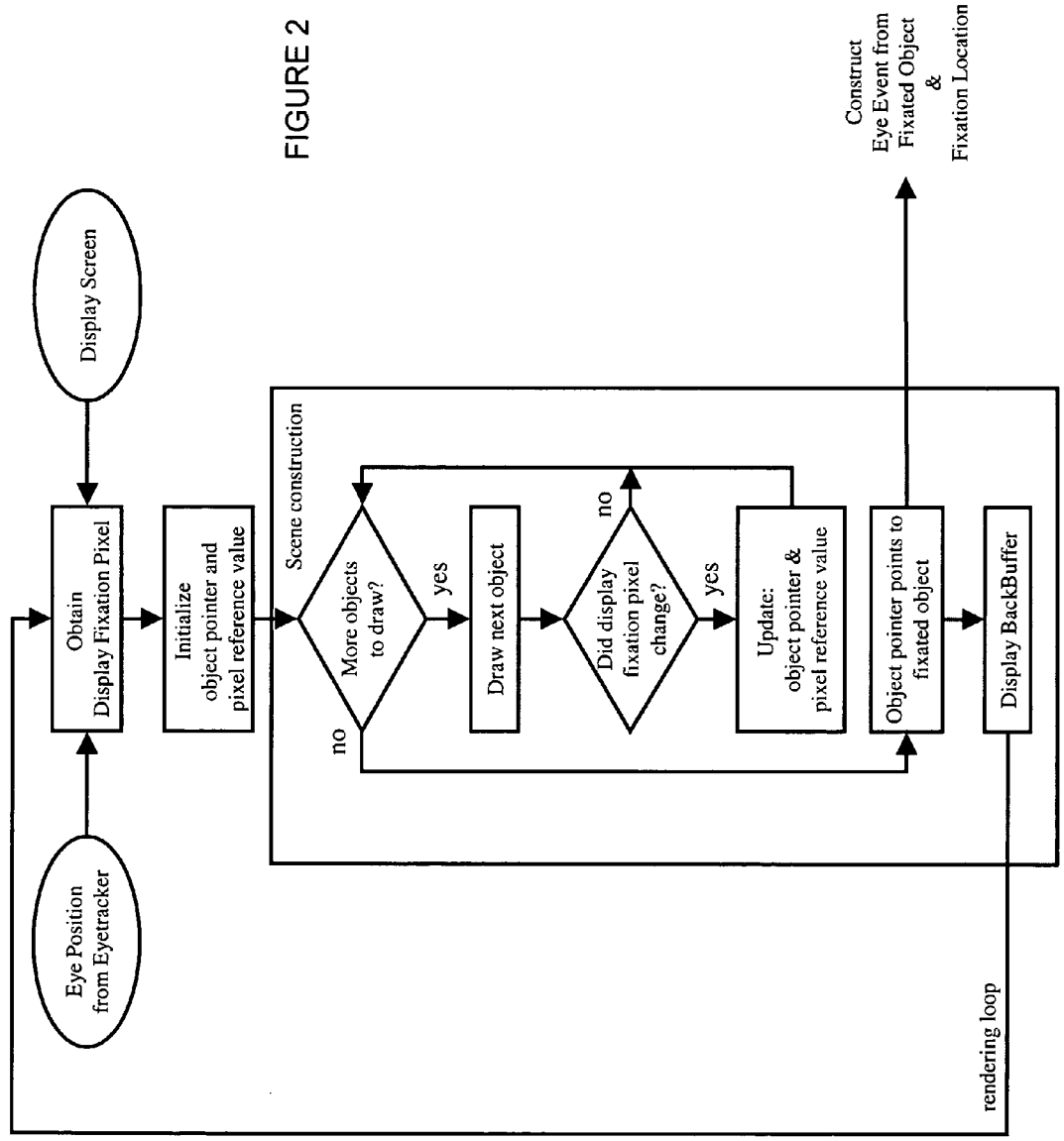
FIG. 2 is a flow chart representation of a preferred computational method for eye-events based on pixel values.

FIG. 2 describes the preferred method for computing eye events. It specifies the main rendering loop of the system. Each rendering-loop iteration determines the fixated object in the GUI display screen that corresponds to the current eye position, and uses that fixated object to construct an eye event.

At the beginning of each rendering-loop iteration, eye position is obtained from an eye-tracker and is registered to the display screen to identify a display fixation pixel. Next, an initial null value is given to the result object pointer and an initial null value is assigned to the pixel reference value. Immediately after each object is drawn, the display fixation pixel is tested. If the display fixation pixel value changed, the object pointer is updated so that it references the object that altered the display fixation pixel and the pixel reference value is updated with the pixel value found in the altered fixation pixel. After all objects are drawn, the object pointer references the fixated object, the graphical object that is visible at the fixation pixel. An eye event is then created, and minimally contains or references the time the event occurred, the display fixation pixel location, and the fixated object.

The eye-tracker is a hardware device that follows an individual's eyes to determine current eye position. An eye-tracker can be obtained as a commercial product. Typical eye-trackers capture eye position every $1/30^{th}$ of a second or faster. The software that accompanies most eye-trackers includes an API for integrating the eye-tracker directly into application systems and registering the eye position with the application display screen. The display screen is the computer display that is constructed and rendered in the rendering loop. The display fixation pixel is a single display pixel that is associated with eye position. Eye position is obtained from an eye-tracker. It is registered to the computer screen using standard methods that are usually included with the eye-tracker software. The corresponding eye point on the computer screen is then translated into the display pixel that includes the point.

The object is a class object, structure, or other computer data element that represents a graphical object. Typically such objects contain location, animation, and rendering information. Additional information that describes object properties or behaviors may also be included. The use of objects to represent the graphical objects found in computer games and simulations is well known. Detailed description of such techniques can be found in numerous computer graphics texts.

The object pointer is a computer word that points to an object location. The object pointer contains an address where the computer object that represents the graphics object is found. Initially the object pointer is set to null. At the end of the rendering loop iteration, the object pointer points to the computer object that is visible at the display fixation point found on the computer screen.

The fixated object is the object that is visible at the display fixation pixel. The pixel reference value is the pixel value found at the display fixation pixel. The value represents the color that is displayed at the pixel location. Typically, the color of the pixel is stored in ARGB format or Alpha, Red, Green, Blue format. Initially, the pixel reference value is set to null value. At the end of the rendering loop iteration, the pixel reference value will contain the color of the display fixation pixel.

The eye event is a computer data element that represents eye position or fixation on the display screen. The eye event minimally includes the time the position was sampled, the display fixation pixel location, a pointer to the fixated object, and possibly the type of eye movement that produced the fixation. The eye events provide access to the fixated objects. Since the fixated objects are stored as class objects, methods that further describe the fixated objects can be developed and accessed by trapping the eye events. This enables programs that use eye events to perform such operations as asking objects to describe themselves, initiating object fixation behaviors, and animating objects in response to eye movements.

The display backbuffer is a standard graphics technique in which the backbuffer and the display surfaces are flipped. That is the backbuffer becomes the display surface and the display becomes the backbuffer surface. Routines to implement these operations are normally found in the SDKs of the graphics libraries supported by the computer video card.

The rendering loop is typically the main loop of a simulation or game. Typically, the rendering loop runs continuously and each iteration repaints the scene. Examples can be found in DirectX and OpenGL documentation.

The method described with reference to FIG. 2 does not alter the rendering pipeline associated with modern computer video cards. Rather, it uses the functionality found in video cards to test changes that may occur after an object is drawn to determine what object is associated with a fixation point.

In modern graphics systems supported by video graphics cards such as DirectX or OpenGL, this method can be implemented by locking the video buffer and testing the display fixation pixel value. This method will fail in the rare case where two objects produce the same colored pixel at the display fixation point. In applications where this would be a problem, the basic method can be improved by simply including additional testing of the non-display portion of the pixel for changes. The efficiency of the method can be further enhanced through the use of simple feasibility culling techniques. There is no reason to test for pixel changes if the drawn object cannot produce changes in the display fixation pixel.

Figure 3A:
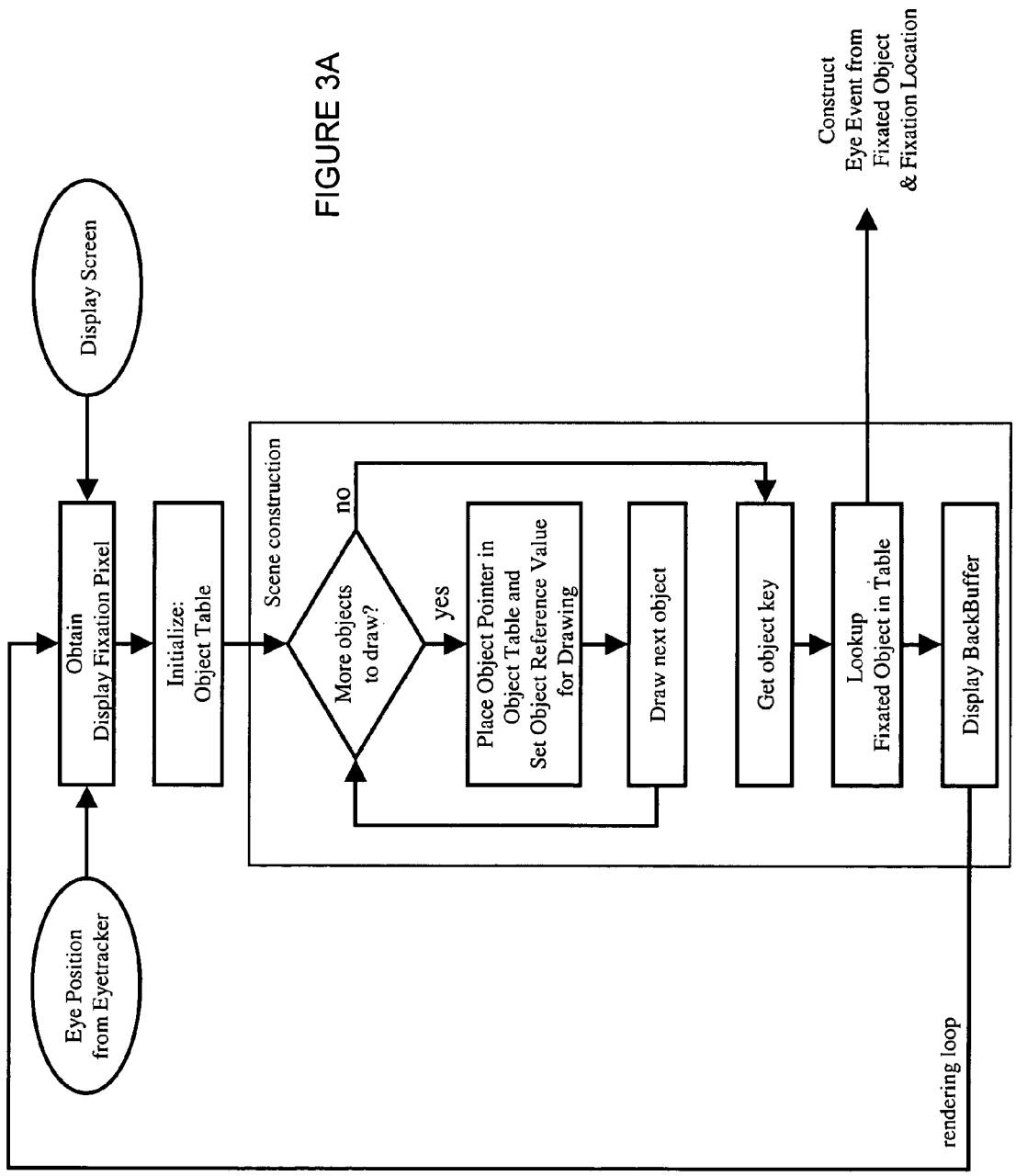
FIG. 3A is a flowchart representation of an alternative computational method for eye-events based on non-display pixel values.

FIG. 3A describes an alternative method for computing eye events. It specifies the main rendering loop of the system. Each rendering-loop iteration determines the fixated object in the GUI display screen that corresponds to the current eye position, and uses that fixated object to construct an eye event.

At the beginning of each rendering-loop iteration, eye position is obtained from an eye-tracker and is registered to the display screen to identify a display fixation pixel. Next, the object table is initialized as empty. Before each object is drawn in the rendering loop a pointer to the object is placed in the object table and the object reference value is set to the object key that corresponds to the location of the object in the object table. As each object is drawn, the object reference value is coded into a field in the non-display pixel bits for each pixel that is altered. After all objects are drawn, the non-display bits for each pixel contain information that corresponds to the index of the object present at that pixel.

The eye-tracker is a hardware device that follows an individual's eyes to determine current eye position. An eye-tracker can be obtained as a commercial product. Typical eye-trackers capture eye position every $\frac{1}{30}^{th}$ of a second or faster. The software that accompanies most eye-trackers includes an API for integrating the eye-tracker directly into application systems and registering the eye position with the application display screen.

The display screen is the computer display that is constructed and rendered in the rendering loop. The display fixation pixel is a single display pixel that is associated with eye position. Eye position is obtained from an eye-tracker. It is registered to the computer screen using standard methods that are usually included with the eye-tracker software. The corresponding eye point on the computer screen is then translated into the display pixel that includes the point.

The object is a class object, structure, or other computer data element that represents a graphical object. Typically such objects contain location, animation, and rendering information. Additional information that describes object properties or behaviors may also be included. The use of objects to represent the graphical objects found in computer games and simulations is well known. Detailed description of such techniques can be found in numerous computer graphics texts.

The object pointer is a computer word that points to an object location. The object pointer contains an address where the computer object that represents the graphics object is found. Initially the object pointer is set to null. At the end of the rendering loop iteration, the object pointer points to the computer object that is visible at the display fixation point found on the computer screen.

The object table is a data structure that is indexed by the object key and stores object pointers. The object reference value is a bit-pattern that represents an object key for the object that is currently being drawn. The object reference value is written into bits in the non-display portion of each pixel that is modified when the object is drawn.

The object key is a key that allows lookup in the object table. The simplest key is the row index of the object table. The bit-pattern written into the non-display portion of the each pixel through use of the object reference value is used to determine the object key. Typically the object reference value and the object key represent the same coding for table keys. The only distinction is that the object key is associated with the fixated object and the object reference value is associated with an arbitrary object as it is being drawn. The fixated object is the object that is visible at the display fixation pixel.

The eye event is a computer data element that represents eye position or fixation on the display screen. The eye event minimally includes the time the position was sampled, the display fixation pixel location, a pointer to the fixated object, and possibly the type of eye movement that produced the fixation. The eye events provide access to the fixated objects. Since the fixated objects are stored as class objects, methods that further describe the fixated objects can be developed and accessed by trapping the eye events. This enables programs that use eye events to perform such operations as asking objects to describe themselves, initiating object fixation behaviors, and animating objects in response to eye movements.

The display backbuffer is a standard graphics technique in which the backbuffer and the display surfaces are flipped. That is the backbuffer becomes the display surface and the display becomes the backbuffer surface. Routines to implement these operations are normally found in the SDKs of the graphics libraries supported by the computer video card.

The rendering loop is typically the main loop of a simulation or game. Typically, the rendering loop runs continuously and each iteration repaints the scene. Examples can be found in DirectX and OpenGL documentation.

The method does not alter the rendering pipeline associated with modern video cards. Rather, it uses the functionality found in video cards to write a unique object reference value into the non-display bits for each pixel that is drawn by an object. After all objects are drawn, the object reference value associated with the display fixation point is retrieved and used to lookup the object pointer associated with the fixated object in the object table.

In modern graphics systems supported by video cards such as DirectX and OpenGL, this method can be implemented by writing the object reference value into the stencil buffer for every written pixel. When all objects are drawn, the stencil buffer value for each pixel will correspond to the object table index for the object present at the corresponding pixel.

Figure 3B:
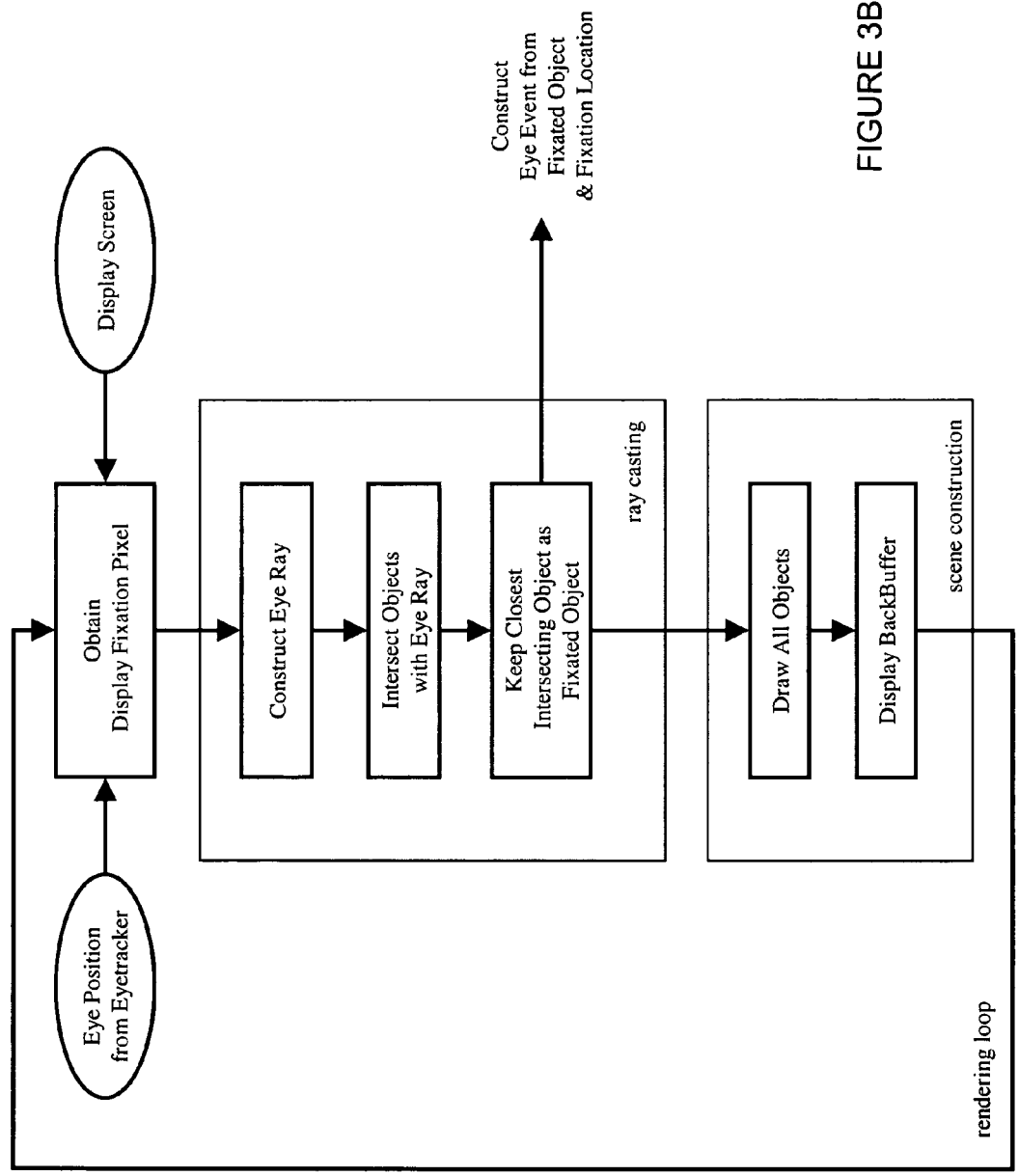
FIG. 3B describes a second alternative method for computing eye events based on a ray-casting technique.

FIG. 3B describes a second alternative method for computing eye events based on a ray-casting technique. It specifies the main rendering loop of the system. Each rendering-loop iteration determines the fixated object in the GUI display screen that corresponds to the current eye position, and uses that fixated object to construct an eye event.

At the beginning of each rendering-loop iteration, eye position is obtained from an eye-tracker and is registered to the display screen to identify a display fixation pixel. Next, an eye ray is constructed from the eye point through the display screen plane at the display fixation pixel. The eye ray is then intersected with all of the objects that make up the scene that will be rendered on the display screen. The object closest to the eye point is the fixation object. The eye event is constructed from the fixated object and the location of the display fixation pixel. At the end of the rendering loop iteration, all objects are drawn to the backbuffer (draw all objects) and then the backbuffer is flipped with the display buffer (display backbuffer). The rendering loop then iterates.

The eye-tracker is a hardware device that follows an individual's eyes to determine current eye position. An eye-tracker can be obtained as a commercial product. Typical eye-trackers capture eye position every $1/30^{th}$ of a second or faster. The software that accompanies most eye-trackers includes an API for integrating the eye-tracker directly into application systems and registering the eye position with the application display screen. The display screen is the computer display that is constructed and rendered in the rendering loop.

The display fixation pixel is a single display pixel that is associated with eye position. Eye position is obtained from an eye-tracker. It is registered to the computer screen using standard methods that are usually included with the eye-tracker software. The corresponding eye point on the computer screen is then translated into the display pixel that includes the point.

The eye ray is an imaginary ray constructed from the eye-point through the display screen plane at the display fixation pixel on to infinity or to an arbitrary point beyond which nothing is visible. The object is a class object, structure, or other computer data element that represents a graphical object. Typically such objects contain location, animation, and rendering information. Additional information that describes object properties or behaviors may also be included. The use of objects to represent the graphical objects found in computer games and simulations is well known. Detailed description of such techniques can be found in numerous computer graphics texts.

An intersecting object is an object that intersects with the eye ray. The closest intersecting object is the intersecting object that is closest to the eye. The fixated object is the closest intersecting object. It is the object that is visible at the display fixation pixel.

The eye event is a computer data element that represents eye position or fixation on the display screen. The eye event minimally includes the time the position was sampled, the display fixation pixel location, a pointer to the fixated object, and possibly the type of eye movement that produced the fixation. The eye events provide access to the fixated objects. Since the fixated objects are stored as class objects, methods that further describe the fixated objects can be developed and accessed by trapping the eye events. This enables programs that use eye events to perform such operations as asking objects to describe themselves, initiating object fixation behaviors, and animating objects in response to eye movements.

The draw all objects operation is accomplished through standard calls to the graphics library. Typically this involves loading vertices that represent the object in the vertex buffer of the graphics card and then drawing the primitives that are loaded in the vertex buffer to a backbuffer display surface.

The display backbuffer is a standard graphics technique in which the backbuffer and the display surfaces are flipped. That is the backbuffer becomes the display surface and the display becomes the backbuffer surface. Routines to implement these operations are normally found in the SDKs of the graphics libraries supported by the computer video card.

The rendering loop is typically the main loop of a simulation or game. Typically, the rendering loop runs continuously and each iteration repaints the scene. Examples can be found in DirectX and OpenGL documentation. The method does not alter the rendering pipeline associated with modern video cards.

Figure 4:
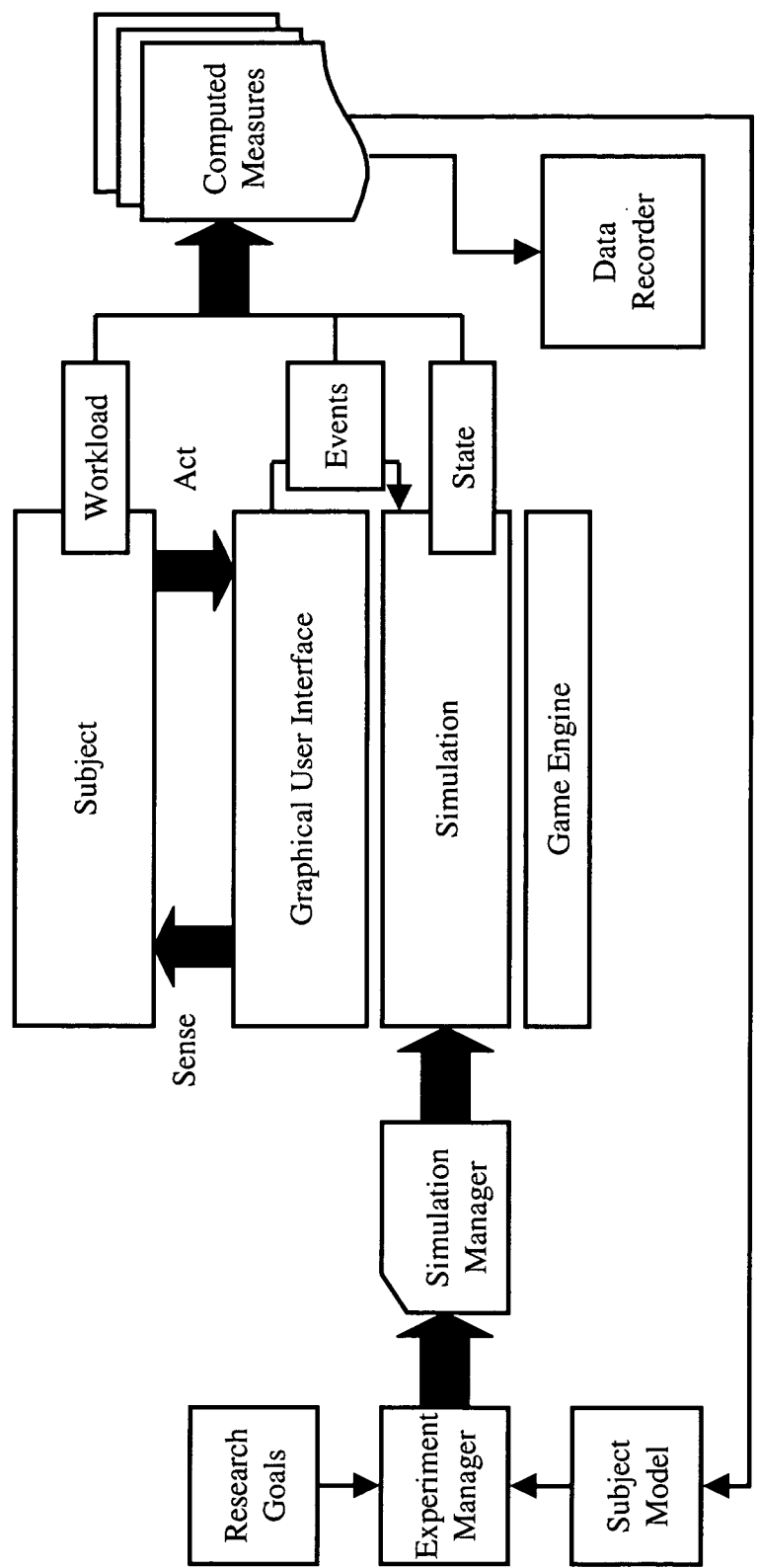
FIG. 4 is a block diagram representation of an eye-event-based research system that represents a first alternative embodiment of the invention.

FIG. 4 is a schematic drawing of a research subject using an alternative embodiment of the present invention by interacting through a graphical user interface with a computer simulation that may be built using a game engine. A simulation manager responds to feedback that results from subject interaction with the interface by dynamically directing the activities and presentation of the simulation. As the simulation is running, workload, event loop, and simulation state data are collected and combined to form computed measures that may be recorded using a data recorder for later analysis and/or playback. The computed measures are feedback into a subject model that represents current student understanding. An experiment manager compares the data found in the subject model with the overall research goals and provides direction to the simulation manager.

The system is intended collect data on a subject while conducting a high-performance skill. The computed measures capture subtle performance aspects. The eye events enable the development of this system as they capture the manner in which the subject utilizes critical cognitive resources. This enables the development of computed measures that couple subject workload and simulation state to cognitive activities.

The subject is an individual whose performance is currently being measured by the system. The research goals describe the overall goals associated with measuring subject skills. These goals are normally developed offline by the research investigators.

The experiment manager decides how best to develop trainee skills. The manager reviews the collected data and recommends the experiment course of action to the simulation manager. The subject model maintains an understanding of the current state of subject performance. It receives feedback the computed measures and uses this feedback to update the current state.

The simulation manager directs the simulation to exhibit behaviors that enable further data collection directed at exploring the research goals. The graphical user interface, simulation, game engine, workload, events, state, computed measures, and data recorder are as described under FIG. 1.

Figure 5:
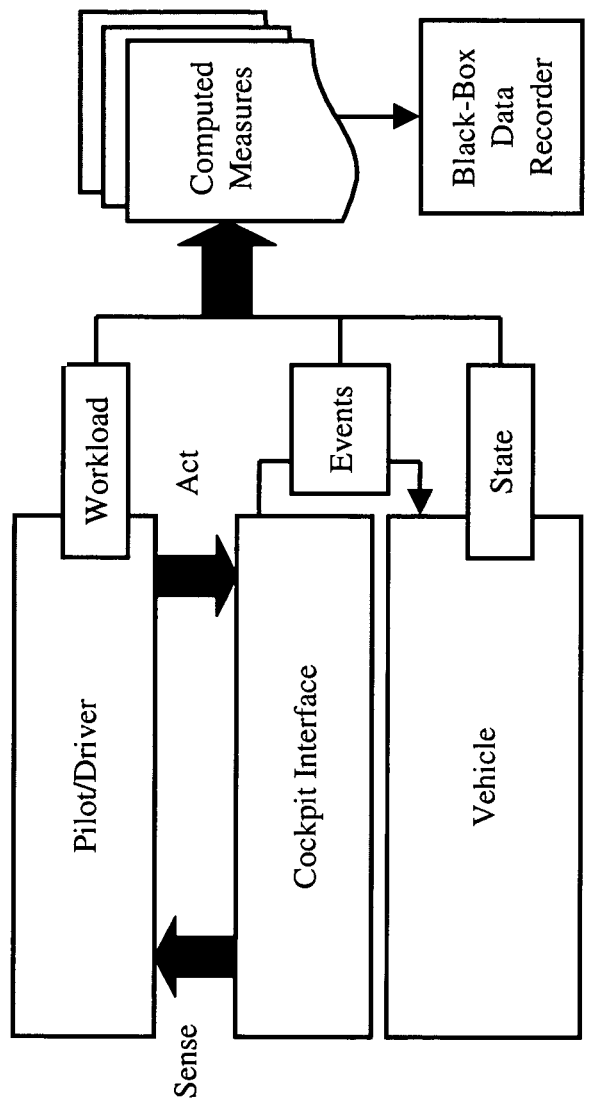
FIG. 5 is a block diagram representation of an eye-event-based "black box" vehicle data recorder that represents a second alternative embodiment of the invention.

FIG. 5 is a schematic drawing of a pilot/driver using an alternative embodiment of the present invention by interacting through a cockpit interface with a vehicle. As the vehicle is in operation, workload, events, and vehicle state data are collected and combined to form computed measures that are recorded using a black box data recorder for later analysis and/or playback.

The system captures computed measures in a vehicle "black box" that can be analyzed after critical events to fully understand the cognitive activity of the pilot/driver. The eye events enable the development of this system as they capture the manner in which the subject utilizes critical cognitive resources. This enables the recording of computed measures that couple subject workload and simulation state to cognitive activities.

The pilot/driver represents an aircraft pilot or an automotive driver. The driver may be either onboard or remote. The cockpit interface is a virtual interface found in modern vehicles, a model of the static view of a physical cockpit, or a hybrid virtual-physical cockpit. The vehicle is an aircraft or automobile.

The pilot/driver workload can be measured using a variety of methods that are well known to the field of biomedical engineering. Typical methods described in the literature include cardiac measurement methods such as heart rate and HRV; ocular measurement methods such as blink rate and blink duration; respiratory measurement methods such as respiration rate and depth; brain activity measurement methods such as EEG, ERP, ERN, PET, FMRI, NIR, and FNIR. An overview of such methods can be found in The BioMedical Engineering Handbook edited by J. D. Bronzino, and published in 1995 by CRC Press, Inc.

The events consist of pilot/driver interactions with the cockpit interface and eye-events. The cockpit events include such operations as steering, joystick movement, throttle adjustments, button pushing, switch throwing, etc. The eye-events are produced when the user visually fixates an object present in the cockpit interface.

The state represents the current condition of the dynamic nature of the vehicle. The state can be represented by a variety of standard computer representations such as a vector, array, structure, object, or finite state machine. It may include a history of conditions that allowed the vehicle to reach the current state. It may also include a set of attributes that further describe each of the elements of the current state.

The computed measures are calculated using the following: pilot/driver workload values, events from the augmented event loop, and the state of the vehicle. These measures quantify operator interaction with the vehicle. These measures may also include pass-through values associated with workload, events, and state values.

The black box data recorder records the operator workload, events from the augmented event loop, vehicle states, and the computed measures for later review and analysis. This recorder may be hardened to withstand vehicle crashes and fires.

Figure 6:
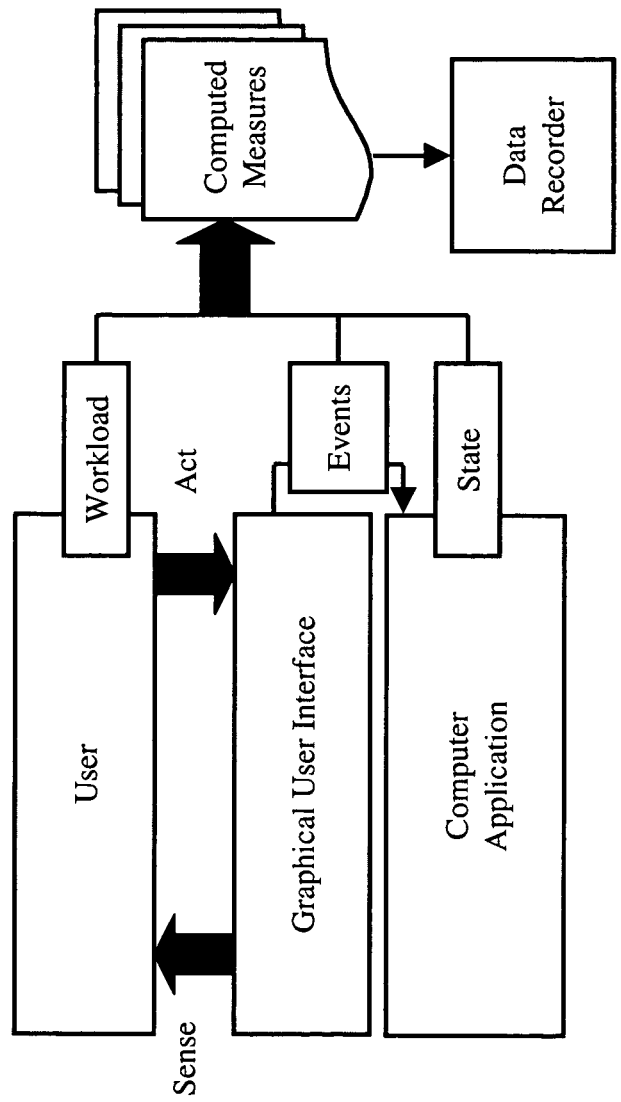
FIG. 6 is a block diagram representation of an interface evaluation system that represents a third alternative embodiment of the invention.

FIG. 6 is a schematic drawing of a computer user using an alternative embodiment of the present invention by interacting through a graphical user interface with a computer application. As the computer application is running, workload, events, and computer application state data are collected and combined to form computed measures that are recorded for later analysis and/or playback.

The system analyzes user interactions with a computer application. The eye events enable the development of this system as they capture the manner in which the subject utilizes critical cognitive resources. This enables the development of computed measures that couple subject workload and simulation state to cognitive activities.

The user is an individual that is operating a computer application. The computer application is any computer program that is operated using a graphical user interface. The application state is the current status of the application at a given instant in time. The computed measures are calculated from the following: user workload values, events from the augmented event loop, and the state of the computer application. These measures quantify concepts that evaluate user performance with the computer application.

The data recorder records the user workload, the events from the augmented event loop, the simulation states, and the computed measures for later review and analysis. The graphical user interface, workload, and events are as described in FIG. 1.

Figure 7:
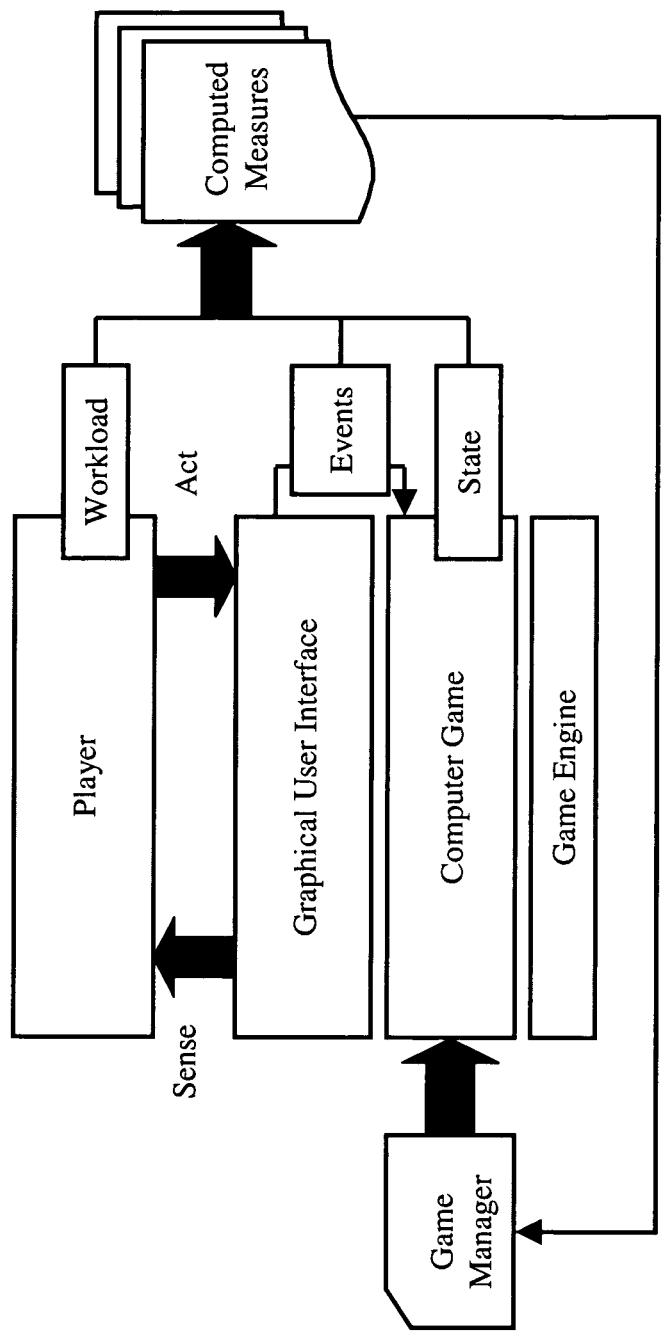
FIG. 7 is a block diagram representation of a computer game that represents a fourth alternative embodiment of the invention.

FIG. 7 is a schematic drawing of a computer game player using an alternative embodiment of the present invention by interacting through a graphical user interface with a computer game that may be built using a game engine. As the game is running, player workload, events, and computer game state data are collected and combined to form computed measures that feedback into a game manager. The game manager controls the game and uses this feedback to create interesting game behaviors.

The system describes computer games that exhibit interesting and meaningful behavior in response to player eye movements. For example, consider a computer game in which the player takes the role of a football quarterback, and the defensive players within the game respond to the quarterback's visual attention. Such interactions would make the game playing more realistic. The eye events enable the development of this system as they capture the visual behavior of the player. This enables the game to exhibit reactive behaviors.

The player is an individual that is playing the computer game. The computer game is a computer application that is used for entertainment or skill development. It may be implemented on a conventional computer, a game playing station, or a game box.

The game state represents the current condition of the dynamic nature of the game at an arbitrary point in time. The state can be represented by a variety of standard computer representations such as a vector, array, structure, object, or finite state machine. It may include a history of conditions that allowed the game to reach the current state. It may also include a set of attributes that further describe each of the elements of the current state.

The computed measures are calculated using the following: player workload values, events from the augmented event loop, and the state of the game. These measures quantify player interaction with the game. These measures may also include pass-through values associated with workload, events, and state values.

The game manager controls the behaviors of the game. It receives the computed measures as feedback and uses those measures to control game behaviors. The graphical user interface, workload, events, and game engine are as described in FIG. 1.

Figure 8:
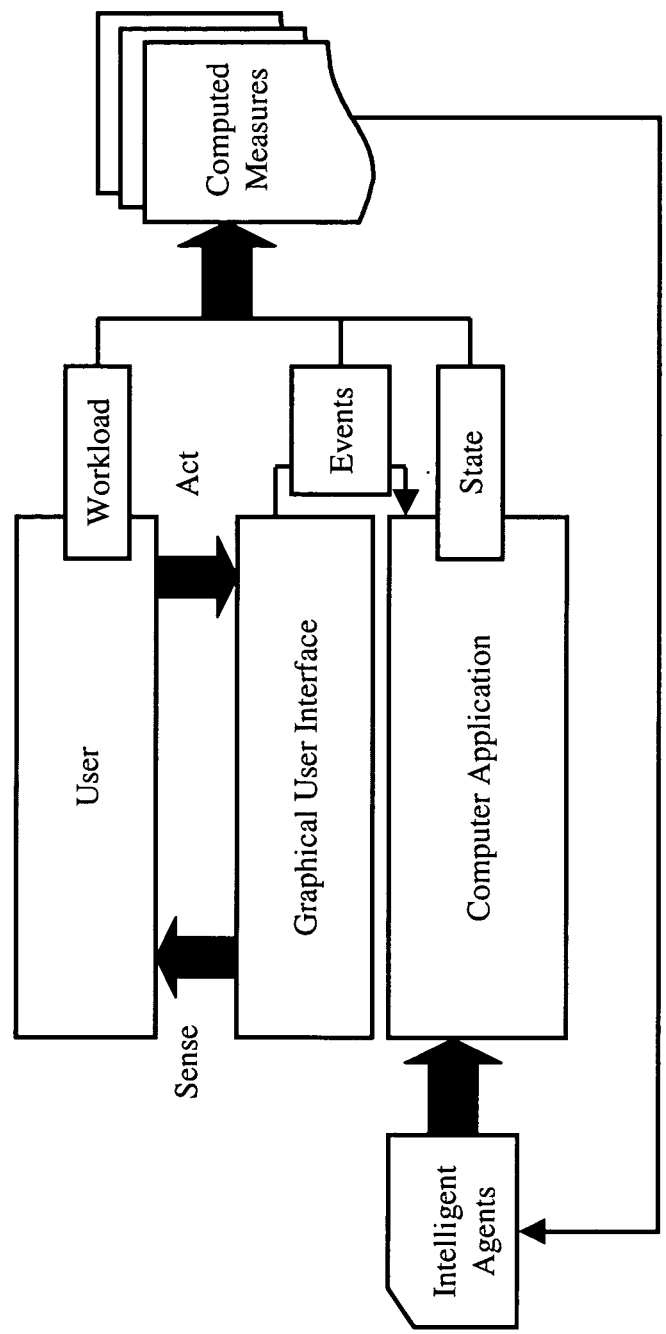
FIG. 8 is a block diagram representation of a cooperative user interface that represents a fifth alternative embodiment of the invention.

FIG. 8 is a schematic drawing of a computer user using an alternative embodiment of the present invention by interacting through a graphical user interface with a computer application. As the application is running, user workload, events, and computer application state data are collected and combined to form computed measures that feedback into an intelligent agent. The intelligent agent works with the computer user to cooperatively operate the computer application.

The system creates a cooperative computer environment in which the user and the intelligent agents cooperatively solve the computer application or task. The system provides the capability for the intelligent agents to monitor user behavior and suggest alternative behavior and/or construct their own behaviors that are synergistic to user behavior. The system encourages cooperative problem or task solution by the user and the intelligent agents. The eye events enable the development of this system as they capture the visual behavior of the user and enable the intelligent agents to understand user behavior and execute synergistic problem solving activities.

The user is an individual that is working with the computer application to cooperatively solve a problem or complete a task. The computer application is an arbitrary computer program that is operated through a graphical user interface. The computer application may also control or manage another system or mechanical device.

The state represents the current condition of the dynamic nature of the computer application at an arbitrary point in time. The state can be represented by a variety of standard computer representations such as a vector, array, structure, object, or finite state machine. It may include a history of conditions that allowed the game to reach the current state. It may also include a set of attributes that further describe each of the elements of the current state.

The computed measures are calculated using the following: user workload values, events from the augmented event loop, and the state of the computer application. These measures may also include pass-through values associated with workload, events, and state values. These measures enable the intelligent agents to monitor user behavior and suggest other user behaviors or adaptively direct their own behavior towards other aspects of the problem.

The intelligent agents are one or more computer tasks, subroutines, procedures, or class objects that are independently operating to cooperatively solve the problem presented by the computer application. The graphical user interface, workload, and events are as described in FIG. 1.

I claim:

1. A training method, comprising the steps of:
defining a set of instructional goals including training objectives;
simulating a learning environment using a user interface and a display with pixels representing 2- and 3-dimensional objects, wherein the location of each object is represented by all of the pixels of the object visible on the display screen, and wherein the objects can move and interact;
monitoring user interactions with the objects, keeping track of which pixels on the display correspond to the interacting objects upon which the user is fixated;
computing various measures based upon the user interactions, including eye events, and simulation state;
recording and time-stamping the computed measures;
recording current user skill level based upon the computed measures;
correlating current user skill level with the training objectives; and
modifying the learning environment in accordance with the correlation.

2. The method of claim 1, wherein the eye events are calculated based upon pixel values.

3. The method of claim 2, including the following steps to compute the eye events:
obtaining a display fixation point from an input device;
initializing an object pointer and fixation point pixel reference value;
updating the object pointer and the pixel reference value as the pixel at the display fixation point changes; and
constructing the eye event from the display fixation point and the object referenced by the latest object pointer.

4. The method of claim 3, wherein the input device is an eye tracker.

5. The method of claim 1, wherein the eye events are calculated based upon non-pixel values.

6. The method of claim 5, including the following steps to compute the eye events:
obtaining a display fixation pixel from an input device;
initializing an object table;
iterating through an object rendering loop and, for each iteration:
placing an object in the object table,
setting the object value, and
drawing the next object;
determining an object key by referencing storage bits in a non-display pixel associated with the display fixation pixel;
using the object key to identify the fixation object through lookup in the object table; and
constructing the eye event from the display fixation point and the resulting fixation object.

7. The method of claim 6, wherein the input device is an eye tracker.

8. The method of claim 1, wherein the eye events are calculated based upon ordered objects that intersect with an imaginary eye ray.

9. The method of claim 8, including the following steps to compute the eye events:
obtaining a display fixation pixel from an input device;
constructing an imaginary eye ray through the display fixation pixel;
intersecting the eye ray with all the graphics objects;
ordering the intersecting objects along the eye ray;
identifying the fixation object as the intersecting object closest to the eyepoint; and
constructing the eye event from the display fixation point and the resulting fixation object.

10. The method of claim 9, wherein the input device is an eye tracker.

11. The method of claim 1, wherein the simulated learning environment is built on top of a game engine.

12. The method of claim 1, wherein the computed measures that are derived using subject workload metrics.

13. The method of claim 1, wherein the simulated learning environment involves vehicle or aircraft control.

14. The method of claim 1, wherein the simulated learning environment is a computer application.

15. The method of claim 1, wherein the simulated learning environment is a computer game.

16. The method of claim 1, wherein the simulated learning environment is a cooperative problem solving environment.

17. A training system, comprising:
a set of instructional goals including training objectives;
a simulated learning environment including a user interface and a display with pixels representing 2- and 3-dimensional objects, wherein the location of each object is represented by all of the pixels of the object visible on the display screen, and wherein the objects can move and interact;
the simulated learning environment being further operative to monitor user interactions with the objects and keep track of which pixels on the display correspond to the interacting objects upon which the user is fixated;
a simulation manager for modifying the learning environment as a function of user interactions;
a set of computed measures based upon the user interactions, including eye events, and simulation state;
a data recorder for recording and time-stamping the computed measures;
a skill model that maintains a record of current user skill level based upon the computed measures; and
an instructor that correlates the current user skill level with the training objectives to modify the learning environment through the simulation manager.

18. The system of claim 17, wherein the eye events are calculated using information from display pixel values.

19. The system of claim 17, wherein the eye events are calculated using information from the non-display pixel values.

20. The system of claim 17, wherein the eye events are calculated using information from ordered objects that intersect an eye ray.

21. The system of claim 17, wherein the eye events are represented as a computer-language structure or a class object.

22. The system of claim 17, wherein the eye events contain data that represents the time the event occurred.

23. The system of claim 17, wherein:
the display is generated using a graphics-rendering loop; and
the eye events are constructed during each iteration of the loop.

24. The system of claim 17, wherein the eye events are based upon a user's eye fixation or eye movement.

25. The system of claim 17, wherein the simulated learning environment is built on top of a game engine.

26. The system of claim 17, wherein:
the goals are research goals; and
the simulation manager is an experiment manager.

27. The system of claim 17, wherein the computed measures that are derived using subject workload metrics.

28. The system of claim 17, wherein the simulated learning environment involves vehicle or aircraft control.

29. The system of claim 17, wherein the simulated learning environment is a computer application.

30. The system of claim 17, wherein the simulated learning environment is a computer game.

31. The system of claim 17, wherein the simulated learning environment is a cooperative problem-solving environment.

* * * * *